Sept. 17, 1940.                    H. C. NIETHAMER                    2,214,860
BUTTER MOLD AND WRAPPER
Filed March 14, 1938
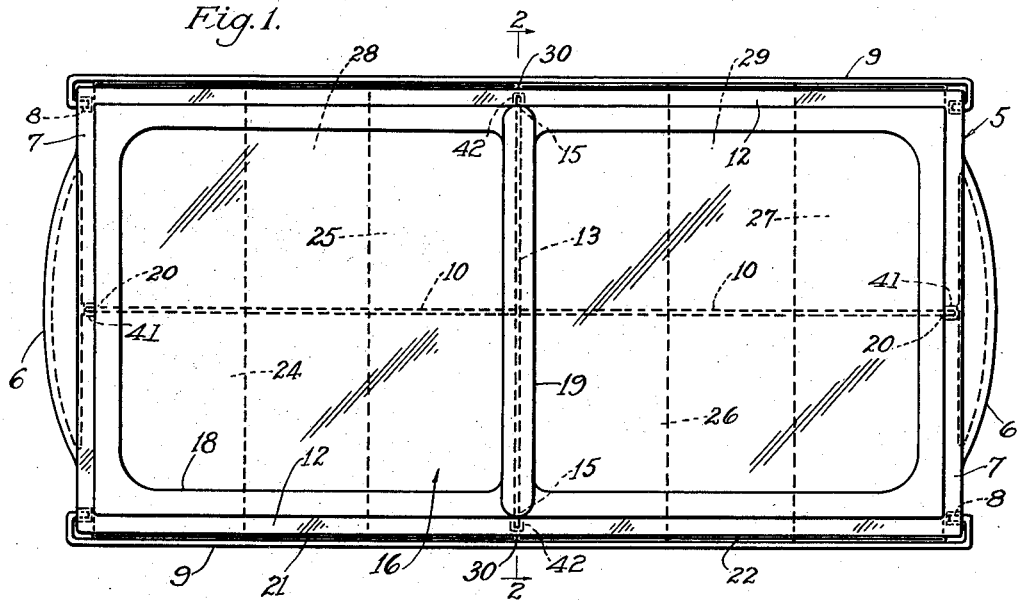
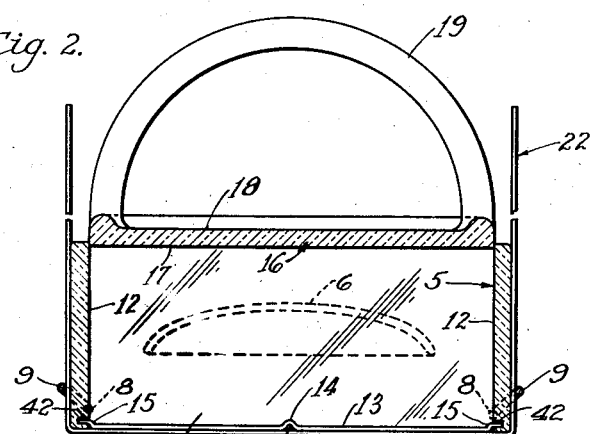
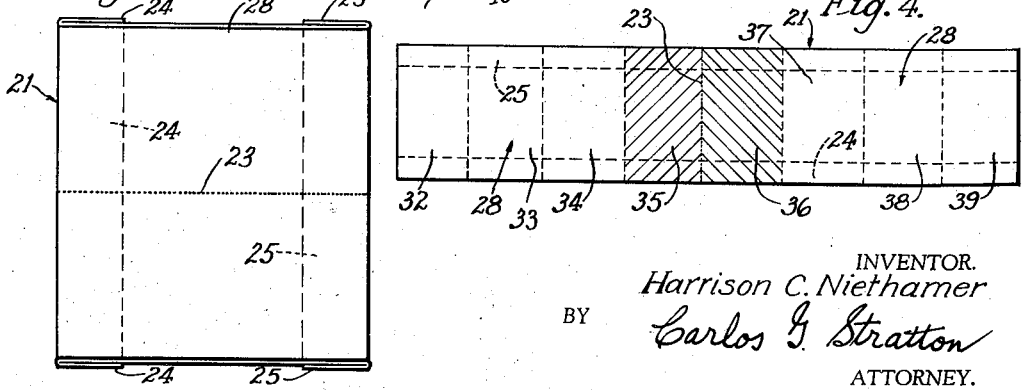
INVENTOR.
Harrison C. Niethamer
BY Carlos G. Stratton
ATTORNEY.

Patented Sept. 17, 1940

2,214,860

UNITED STATES PATENT OFFICE 2,214,860

BUTTER MOLD AND WRAPPER

Harrison C. Niethamer, Huntington Park, Calif.

Application March 14, 1938, Serial No. 195,670

8 Claims. (Cl. 31—7)

My invention relates to a combination of a mold and wrapping means for butter and oleomargarine.

An important object of my invention is to provide a mold for such materials, with wrapping means mounted on the mold, to receive shaped material from the mold ready for wrapping.

Another object is to provide dividing means for the mold, to divide into sections butter or oleomargarine shaped by the mold, in combination with wrapping means separable at the dividing means, to receive from the mold separate pieces of butter or oleomargarine and to envelop the separate pieces.

A still further object is to provide a transparent mold for butter or oleomargarine, whereby the user may see and expel air or water pockets facing the mold.

The invention also comprises novel details of construction and novel combinations and arrangements of parts, which will more fully appear in the course of the following description.

In the drawing, like reference characters designate similar parts in the several views.

Figure 1 is a plan view of an embodiment of my invention.

Figure 2 is a section taken on the line 2—2 of Figure 1.

Figure 3 is a face view of a double wrapper comprised in the invention, partly folded at right angles.

Figure 4 is a face view of the same wrapper, laid flat and turned at right angles to Figure 3.

Referring more in detail to the drawing, the reference numeral 5 generally designates a glass or other rectangular, transparent mold, having upwardly cupped handles or finger grips 6.

Ends 7 of the mold have sockets in which bent ends 8 of wires 9 are sprung whereby the wires 9 are under their own spring tension. As will be noticed from Figure 1, the bent ends 8 project toward each other, thus forming axes upon which the wires 9 move pivotally. The wires 9 may thus be swung around the lower longitudinal edges of the mold.

A wire 10 is provided lengthwise of the mold, at the bottom thereof, and midway between the sides 12 of the mold 5. Another wire 13 is disposed transversely of the mold, also at the bottom, and midway between the ends 7 of the mold. The wire 13 is bent around the wire 10, as shown at 14, which is at the center of the bottom of the mold. The wires may be soldered together at this central crossing.

The inner faces of the ends 7 and sides 12 are recessed relatively short distances above the lower edges of said ends and sides, as shown at 41 and 42 respectively. Offset end portions 15 of the wire 13, and similar offset end portions 20 of the wire 10, fit in the said recesses of the sides 12 and ends 7 respectively. Of course these wires have to be bent and sprung into the recesses, whereby they are firmly held in position at the bottom of the mold.

A lid 16 having a flat bottom 17 and a dished top 18 is provided for the mold. The lid has a close sliding fit with the ends and sides of the mold. A bowed handle 19 is mounted on the lid, for manipulation thereof.

Closing the bottom of the mold are folded wrapping means 21 and 22, such as sheets of the conventional waxed paper for wrapping butter and oleomargarine. Hereinafter, the wrapping means shall be referred to as sheets of paper, although it is to be understood that other suitable wrapping means may be employed, such as Cellophane. In Figures 3 and 4, the sheet of paper has been indicated by the reference number 21, although paper 22 is the same.

Preferably each sheet is perforated, as suggested at 23. This perforation is placed directly under the adjacent portion of the wire 10. In other words, the perforation of the sheet 21 is placed under and in vertical alinement with the right half of the wire 10, as shown in Figure 1, while the perforation of the sheet 22 is placed under and in vertical alinement with the right half of the wire 10, as shown in Figure 1.

Portions 24, 25, 26 and 27 of the sheets of paper cover the ends of quarter sections of butter or oleomargarine. These portions are folded back behind the body portions 28 and 29 of the sheets 21 and 22 respectively.

The sheets 21, 22 together close the bottom of the mold. Folded edges of the sheets abut each other along the wire 13, as suggested at 30 in Figure 1. To mount the sheets of wrapping paper on the mold, the wires 9 are swung downward from their positions shown in Figure 2. Then after the papers have been placed across the bottom and folded up the sides of the mold, as shown in the same figure, the wires are swung upward against the sides 12 of the mold, as shown in said Figure 2.

In the use of the device, oleomargarine, which has first been mixed with coloring matter, or butter is placed in the mold and packed down tight. The transparency of the mold permits the user to see that air or water pockets have been expressed from the mass.

To expel the mass from the mold in quarter sections, the lid 16 is forced downward as the mold is lifted from its spport by means of the grips 6. These movements cause the wires 10, 13 to cut the mass into substantially equal quarter sections. Two quarters will be on the sheet of wrapping paper 21 and the other two quarters will be on the other sheet of paper 22.

The sheets are then torn apart along the perforated lines 23, so that a quarter section of the material is on each half of a sheet of paper. Shaded areas 35, 36 in Figure 4 represent two quarters of butter or oleomargarine.

After the sheets are torn along the perforated lines 23, the sections of the butter or oleomargarine are wrapped in their respective sheet portions. Referring again to Figure 4, the three unshaded rectangles 32, 33 and 34 are wrapped around the butter or oleomargarine and the folded-under portions 24, 25 cover the ends of the butter or oleomargarine section 35. The unshaded sections 37, 38, 39 and the folded-under portions 24, 25 are utilized to wrap the section 36.

Figure 4 represents only sheet 21, but it is understood that sheet 22 abuts alongside and is torn in halves to wrap the two other quarters of the butter or oleomargarine.

The present device is especially adapted for dividing and wrapping quarter pounds of oleomargarine in the home. The oleomargarine is usually an irregularly shaped mass after the housewife has mixed the coloring matter therein. The present device provides means for making it up into attractive sections, in simulation of butter quarter pounds.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A mold having opposed recesses adjacent the normal bottom of the mold, a wire sprung into the recesses, and a lid fitting and slidable in the mold to expel butter or oleomargarine therefrom, as the wire divides same.

2. A mold having opposed recesses near the normal bottom of the mold, a wire sprung into the recesses, the wire being offset adjacent the portions in the recesses, and the remainder of the wire being substantially in the plane of the bottom of the mold, and a lid fitting and slidable in the mold to expel butter or oleomargarine therefrom, as the wire divides same.

3. A mold for butter or oleomargarine, comprising walls having an open bottom, means for holding a plurality of sheets of wrapping paper across the bottom, a wire disposed at the bottom to divide the butter or oleomargarine for the respective sheets, and a lid fitting and sliding in the mold to expel the divided parts of the mass from the mold, with said parts of the mass in engagement with the sheets respectively.

4. A mold for butter or oleomargarine comprising walls providing a discharge outlet, means at opposite sides of the discharge outlet for holding wrapping paper at the discharge outlet, said means being movable to a position in which it holds the paper and being movable therefrom to a paper-releasing position, and a member fitting and sliding in the mold to expel butter or oleomargarine therefrom and against the paper, effecting movement of said means to the paper-releasing position thereof.

5. A mold for butter or oleomargarine comprising walls providing a discharge outlet, means to engage opposite sides of a sheet of wrapping paper, said means being movable to a position in which it is arranged to hold the sheet at said discharge outlet, said means being movable from its said paper-holding position by movement of the paper in a given direction, and a member fitting and sliding in the mold to expel butter or oleomargarine therefrom and against the paper in said direction to effect movement of said means to the paper-releasing position thereof.

6. A mold for butter or oleomargarine comprising walls providing a discharge outlet, means on the walls at opposite sides of the discharge outlet for holding wrapping paper at the discharge outlet, said means being movable from its paper-holding position to a paper-releasing position, and a member fitting and sliding in the mold to expel butter or oleomargarine therefrom and against the paper, effecting movement of said means to the paper-releasing position thereof.

7. A mold for butter or oleomargarine comprising walls providing a discharge outlet, means bearing against outer faces of the walls and arranged to clamp wrapping paper between said means and said faces, said means being arranged to release the paper by movement of the paper in a given direction, and a member fitting and sliding in the mold to expel butter or oleomargarine therefrom and against the paper in said direction, to effect release of the paper.

8. A mold for butter or oleomargarine having a discharge outlet, spring means bearing against the mold and arranged to clamp wrapping paper between said means and the mold, said means being arranged to release the paper by movement of the paper in a given direction, and a member fitting and sliding in the mold to expel butter or oleomargarine therefrom and against the paper in said direction, to effect release of the paper.

HARRISON C. NIETHAMER.